J. A. LECHLER.
GRINDING MILL.
No. 41,439. Patented Feb 2, 1864.
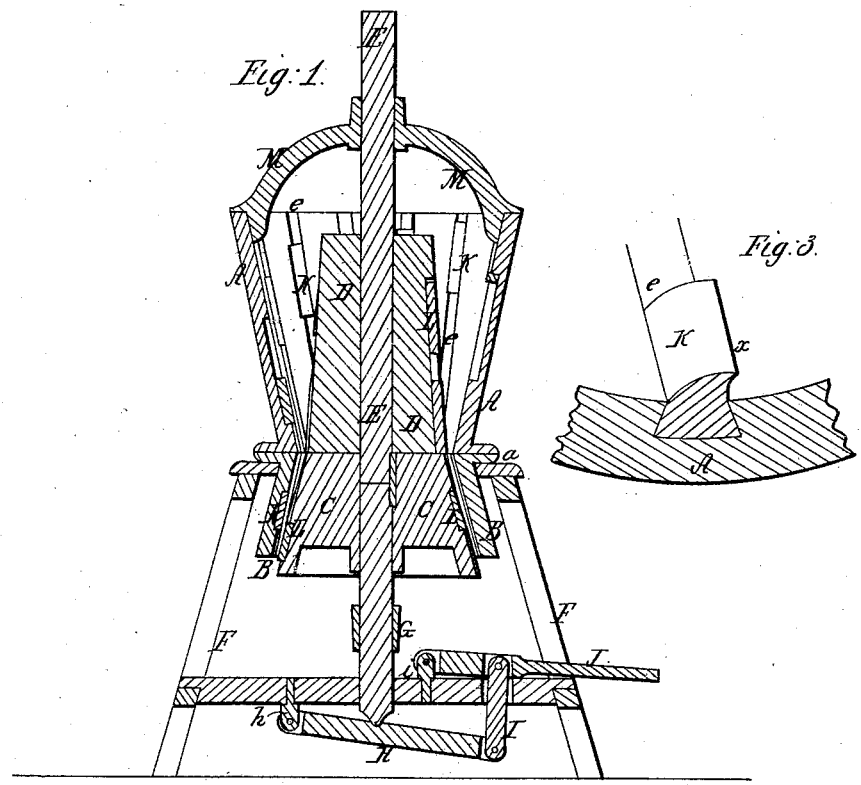
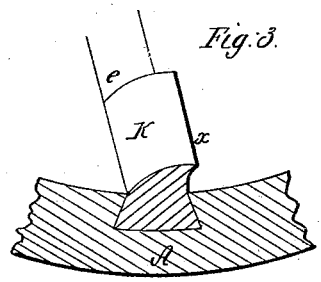
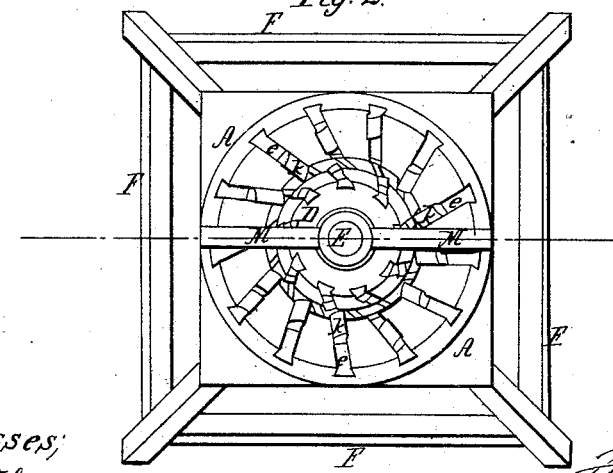

UNITED STATES PATENT OFFICE.

JOHN A. LECHLER, OF PHILADELPHIA, PENNSYLVANIA.

IMPROVEMENT IN GRINDING-MILLS.

Specification forming part of Letters Patent No. 41,439, dated February 2, 1864; antedated January 20, 1864.

*To all whom it may concern:*

Be it known that I, JOHN A. LECHLER, of Philadelphia, Pennsylvania, have invented an Improvement in Grinding-Mills; and I do hereby declare the following to be a full, clear, and exact description of the same, reference being had to the accompanying drawings, and to the letters of reference marked thereon.

My invention consists in forming in the shells and burrs of grinding-mills inclined dovetailed grooves, and fitting into the same certain detachable dovetailed strips of properly-tempered steel, the said strips having cutting-edges, as described hereinafter.

The object of my invention has been to produce a mill which will readily grind bones and other like tough objects.

In order to enable others skilled in this class of machinery to make and use my invention, I will now proceed to describe its construction and operation.

On reference to the accompanying drawings, which form a part of this specification, Figure 1 is a vertical section of my improved mill for grinding bones and other like tough and hard substances. Fig. 2 is a plan view, and Fig. 3 a detached perspective view, of part of the mill, drawn to an enlarged scale.

A and B are the two shells of the mill, secured to each other by bolts or screws passing through suitable flanges, a, the shell B being of the form of a hollow frustum of a cone, and the shell A the hollow frustum of a cone inverted.

D and C are the two burrs, fitted to each other, and both secured to the vertical shaft E, and both being in the form of frustums of cones. The taper of the burr C, however, is somewhat more abrupt than that of the burr D.

The two shells are secured to a suitable frame, F, to which is attached a cross-piece, G, the lower end of the vertical shaft E passing through and turning in this cross-piece, and the shaft resting on a lever, H, which has its fulcrum on a pin passing through a stud, h, secured to the frame F, the outer end of the lever being connected by a link, I, to another lever, J, which has its fulcrum on a pin passing through a stud, i, secured to the frame. The upper end of the vertical shaft passes through and turns in a bridge-piece, M, secured to the upper edge of the shell A.

Motion is communicated to the shaft, and consequently to the two burrs, by driving-belts, or any suitable system of gearing.

In the inside of both shells are cut inclined grooves e, of the dovetailed form best observed on reference to Fig. 3, and into these grooves are fitted strips K, of properly-tempered steel, which are rounded or beveled on one side, so as to present a cutting-edge, x, on the other.

Similar inclined dovetailed grooves are cut in both of the burrs for the reception of similar strips, L, of properly tempered steel.

The bones or other materials are thrown into the space between the shell A and burr D, where they are broken and cut, by the combined action of the sharp-edged steel strips of the shell and those of the burr, into pieces so small as to be admitted to the space between the shell B and burr C, where the pieces are ground by the steel strips to the desired fineness.

By means of the lever J the burrs can be raised or lowered and the space between the burr C and shell B may consequently be increased or diminished, and the bones be reduced to a finer or coarser powder, as desired.

It should be understood that the steel strips or teeth do not extend throughout the entire length of the shells A and burrs D, but are arranged in short pieces at various intervals.

I have found by practical tests that this arrangement of the steel strips has far better crushing and breaking effects than if they were continued throughout the entire length of the burr and shell.

When the edges of the strips become blunt, they can be readily removed, sharpened, and replaced.

I claim as my invention and desire to secure by Letters Patent—

Forming in the shells and burrs of grinding-mills inclined dovetailed grooves, and fitting into the same the detachable dovetailed strips e, of steel, the said strips having cutting-edges, all as described, for the purpose specified.

In testimony whereof I have signed my name to this specification in the presence of two subscribing witnesses.

JOHN A. LECHLER.

Witnesses:
HENRY HOWSON,
JOHN WHITE.